(12) United States Patent
Wilson, Jr.

(10) Patent No.: US 7,926,291 B1
(45) Date of Patent: Apr. 19, 2011

(54) BEARING SUPPORTED ROTOR SHAFT OF A GAS TURBINE ENGINE

(75) Inventor: Jack W Wilson, Jr., Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 462 days.

(21) Appl. No.: 12/184,846

(22) Filed: Aug. 1, 2008

Related U.S. Application Data

(60) Provisional application No. 60/963,084, filed on Aug. 2, 2007.

(51) Int. Cl.
*F02C 3/04* (2006.01)

(52) U.S. Cl. .......................... 60/805; 415/111; 415/142

(58) Field of Classification Search .................. 60/39.08, 60/792, 796, 805; 184/6.11; 415/110, 111, 415/122.1, 132, 142, 170.1, 180, 229; 384/493, 384/517, 518, 557, 905
See application file for complete search history.

(56) References Cited

U.S. PATENT DOCUMENTS

| | | | | |
|---|---|---|---|---|
| 3,491,536 A | * | 1/1970 | Hadaway | 60/798 |
| 4,599,862 A | * | 7/1986 | Bergeron | 60/605.3 |
| 4,900,221 A | * | 2/1990 | Ciokajlo et al. | 415/142 |
| 5,364,194 A | * | 11/1994 | Lubin | 384/493 |
| 5,526,640 A | * | 6/1996 | Brooks et al. | 60/804 |
| 5,836,739 A | * | 11/1998 | Haramura et al. | 415/104 |
| 6,161,768 A | * | 12/2000 | Gordon et al. | 237/12.1 |
| 6,280,095 B1 | * | 8/2001 | Furukoshi et al. | 384/489 |
| 6,606,863 B2 | * | 8/2003 | Napier | 60/772 |
| 2004/0231337 A1 | * | 11/2004 | Jakadofsky | 60/793 |

* cited by examiner

*Primary Examiner* — Michael Cuff
*Assistant Examiner* — Phutthiwat Wongwian
(74) *Attorney, Agent, or Firm* — John Ryznic

(57) ABSTRACT

A small gas turbine engine that operates at high rotational speeds and includes a rotor shaft that is supported on both ends by ball bearings. The aft end ball bearings includes an outer race mounted to the support structure in such a way that axial displacement of the outer race is allowed to prevent axial loads from damaging the ball bearing. The outer race of each bearing is supported by an O-ring to provide damping to the bearings. The O-ring is centered on the outer race, and the outer race is formed thicker than the inner race to provide for a better hoop surface. The outer race in the aft end is pre-loaded with a coil spring to maintain a load on the bearing during all phases of operation of the engine. The bearings are coated with a dry lubricant to eliminate the need for a liquid lubricant and its supply system.

19 Claims, 5 Drawing Sheets

BEARING SUPPORTED ROTOR SHAFT OF A GAS TURBINE ENGINE

CROSS-REFERENCE TO RELATED APPLICATIONS

This application claims the benefit to an earlier filed Provisional Patent Application 60/963,084 filed on Aug. 2, 2007 and entitled SMALL TWIN SPOOL GAS TURBINE ENGINE.

FEDERAL RESEARCH STATEMENT

The US Government has a paid-up license in this invention and the right in limited circumstances to require the patent owner to license others on reasonable terms as provided for by the terms of Contract No. FA9300-04-C-0008 awarded by the United States Army.

BACKGROUND OF THE INVENTION

1. Field of the Invention

The present invention relates generally to a gas turbine engine, and more specifically to the bearings that support the main rotating component of the engine.

2. Description of the Related Art Including Information Disclosed Under 37 CFR 1.97 and 1.98

There are two basic types of bearings used in a gas turbine engine: the ball bearing and the roller bearing. The main rotating component of a gas turbine, the compressor and turbine assembly, must be supported both axially and radially. When the direction of a load is at right angles to the shaft, it is called a radial load. When it is parallel to the shaft, it is called a thrust or axial load. Radial loads are due to rpm changes and aircraft maneuvering, while axial loads result from thrust loads (forward and rearward) from the compressor and turbine. A ball bearing will limit or support both radial and axial loads, while a roller bearing will limit or support only radial loads. Since there is always engine growth because of temperature changes in the engine, one bearing supporting the compressor must always be a ball bearing to absorb both radial and axial loads, while the other must always be a roller bearing to allow axial movement due to changing dimensions in the engine. This is always true for the turbine rotor in larger engines. FIG. 1 shows this prior art arrangement with a ball bearing supporting the front or compressor end of the rotor shaft and a roller bearing supporting the rearward or turbine end of the rotor shaft.

The ball bearing is used in the front end of the engine due to the cooler operating environment. The roller bearing is used in the turbine end because the roller bearing can allow for a small relative axial displacement of the races with respect to the roller elements. Also, the ball bearing does not require a cage. The roller bearing requires a cage and therefore generates more heat from the rubbing of the rollers against the cage. In a small gas turbine engine in which the rotational speeds of the rotor shaft are very high, the cage will develop excessive heat due to the rubbing. Also, the applicant has discovered that the rollers tend to turn sideways when the outer race is displaced axially with respect to the inner race due to the axial loads placed on the bearing. When the roller elements turn sideways they start to skid and not roll. Because the roller bearing is not symmetrical (as in the ball bearing), thus sideways turning of the rolling element results whenever the axial load is applied to the bearing. This is a very unstable result for the bearing.

BRIEF SUMMARY OF THE INVENTION

It is an object of the present invention to support the main rotor shaft of a small gas turbine engine for very high speed rotation.

It is another object of the present invention to rotatably support the main rotor shaft for a small gas turbine engine with a bearing having a symmetrical rolling element in the turbine end of the engine.

It is another object of the present invention to rotatably support the main rotor shaft of a small gas turbine engine with a cageless bearing in the aft or turbine end.

It is another object of the present invention to rotatably support the main rotor shaft of a small gas turbine engine without the need of a liquid lubricant.

It is another object of the present invention to rotatably support the main rotor shaft of a small gas turbine engine in which the bearing in the turbine end It is another object of the present invention to rotatably support the main rotor shaft of a small gas turbine engine in which the bearing in the turbine end can accept relatively higher axial displacement between the races without developing operating problems.

The present invention is a bearing support for the main rotor shaft of a gas turbine engine in which the aft or turbine end bearing is a ball bearing that does not require a cage and in which the outer race of the ball bearing is supported to allow for axial movement on the housing in order to allow for the axial loads that result from engine operation. The aft end ball bearing is supported by a damper ring that provides for damping of the bearing and friction between the outer race and the bearing support of the housing. The ball bearing also includes a preload spring on the outer race.

With the main rotor shaft of the gas turbine engine supported on both ends by ball bearings without cages, the main rotor shaft can operate at higher rotational speeds than the caged bearings of the prior art without overheating. Also, because the ball bearing in the turbine end includes a solid lubricant on the races, a liquid lubricant is not necessary. The ball bearing is supported by a single O-ring to provide enough friction loads between the race and the housing to allow for the outer race to slide with respect to the housing. The ball bearing is also coated with a dry lubricant to eliminate the need for a wet lubricant while allowing for the high speed rotation without producing excessive amount of heat.

DETAILED DESCRIPTION OF THE INVENTION

Figure 1:
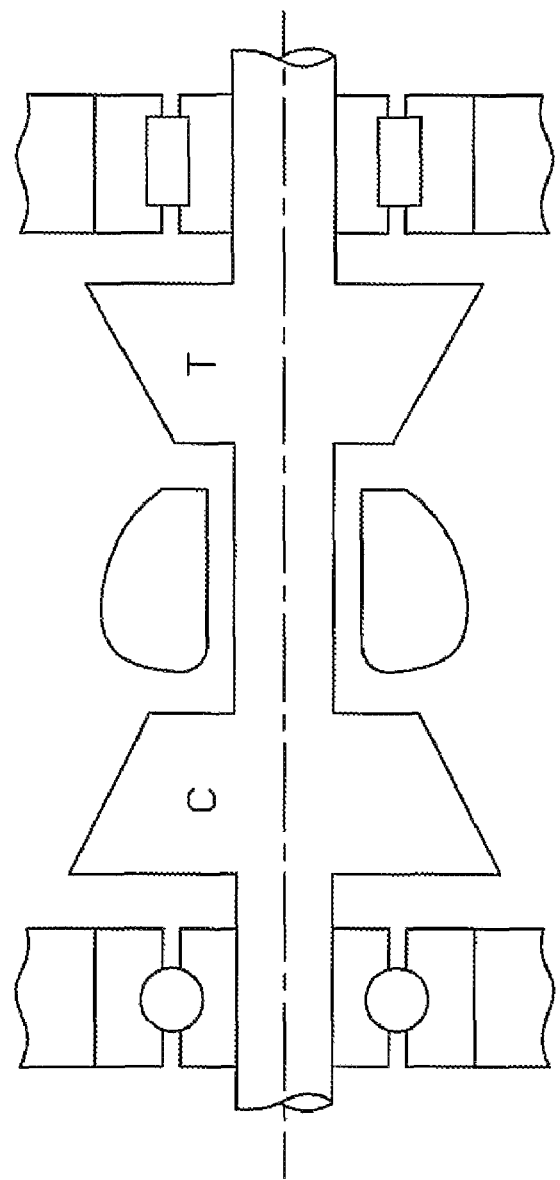
FIG. 1 shows a main rotor shaft supported by bearings of the prior art.
Figure 2:
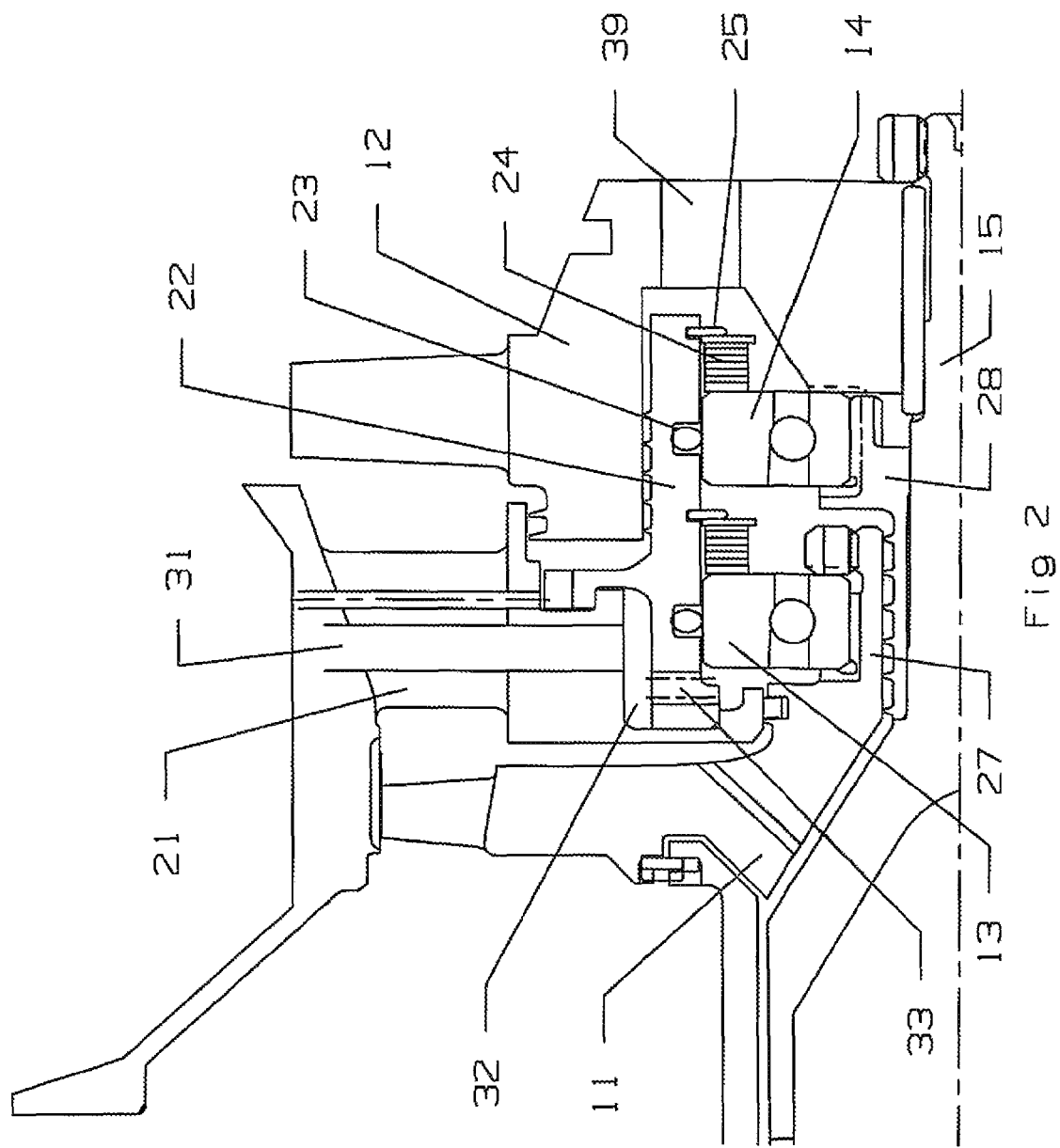
FIG. 2 shows the bearings for the turbine end of the gas turbine engine of the present invention.
Figure 3:
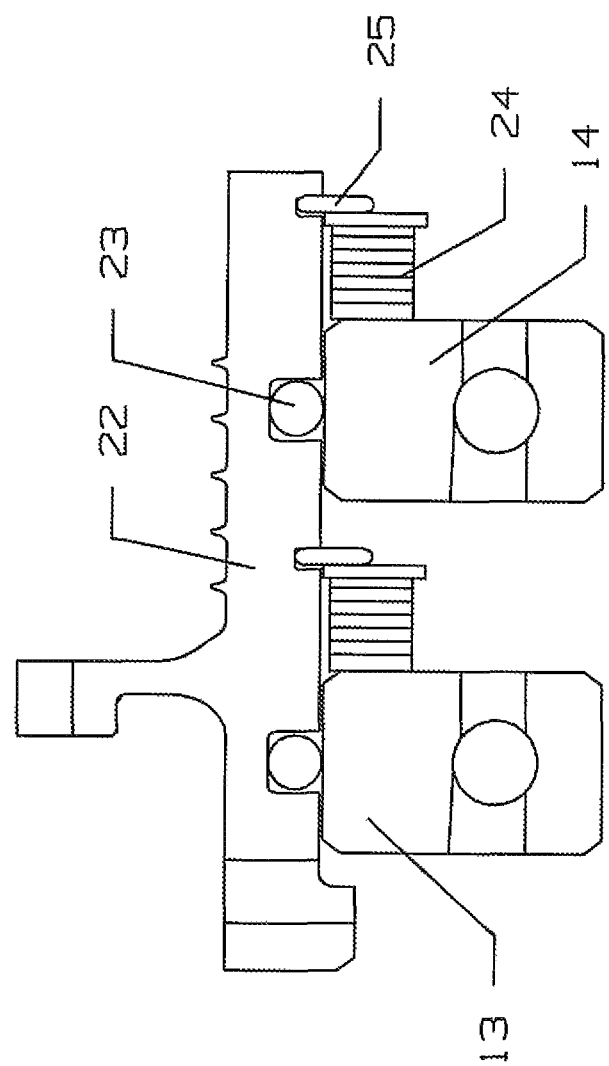
FIG. 3 shows a detailed view of the aft end bearings and support structure of the present invention.

The present invention is shown in FIGS. 2 through 5 for a small gas turbine engine of under 300 pounds thrust in which a prior art engine cannot be scaled down due to the extreme rotor dynamics problems that develop from the high rotational speeds of the rotor shaft. A new design for the rotor shaft with the rotor disks and bearings must be found to allow for these higher speeds as the engine size decreases. In FIG. 2, the rear or turbine end of the engine is shown with the high pressure turbine rotor disk 11 and the low pressure turbine rotor disk 12 supported by the bearings of the present invention. A high speed aft bearing 13 supports the high speed rotor 11 and a low speed aft bearing 14 supports the low speed shaft 15. The high speed bearing 13 is supported by an axial extension of the high pressure turbine rotor disk 11. The low speed bearing 14 is supported on the low speed shaft 15.

A guide vane assembly includes a plurality of guide vanes 21 extending between an outer shroud and an inner shroud. A bearing support surface 22 is rigidly attached to the inner shroud section of the guide vane assembly. The inner side of the bearing support surface includes an annular groove on the inner face extending the full 360 degrees of the annular bearing support surface and is sized to fit an O-ring 23 that provides damping to the bearing. In this embodiment, on O-ring 23 is sued for each bearing and is centered against the outer race of the bearing to provide a frictional force against the outer race. Each of the rear bearings 13 and 14 includes a preload spring 24 held in place by a snap ring 25 to provide a preload against the outer race for the bearing. The aft bearings 13 and 14 in the present invention are both ball bearings instead of the roller type bearings of the prior art gas turbine engines. To allow for the axial displacement of the bearing as described in the prior art, the outer race for each bearing is allowed to slide along the inner surface of the bearing support surface, 24. The preload springs 24 and the O-ring 23 provide the frictional force to hold the bearing in place for operation of the engine while allowing for the axial displacement to take place due to the thermal stresses that develop during engine use.

The aft end bearings includes axial cooling air passages formed between the inner race and the inner race support surface on the axial extension 27 of the rotor disk 11 or an axial sleeve 28 that is fitted over the rear end of the low speed shaft 15 and forms the support surface for the low speed bearing 14. The cooling air passages are formed between the inner race and the support surface. In the present invention, the passages are grooves formed in the support surface, but could also be formed in the inner race as well.

The rear end bearings 13 and 14 are cooled by cooling air supplied through a cooling air passage 31 formed in the vane 21 that opens into a chamber 32 formed between the guide vane 21 and the bearing support surface 22, through a radial hole 33 and then into a space in which the bearings are mounted. The cooling air passes through the bearings and through the passages formed below the inner race, and then out through one or more axial holes 39 formed in the low pressure turbine rotor disk 12.

Figure 4:
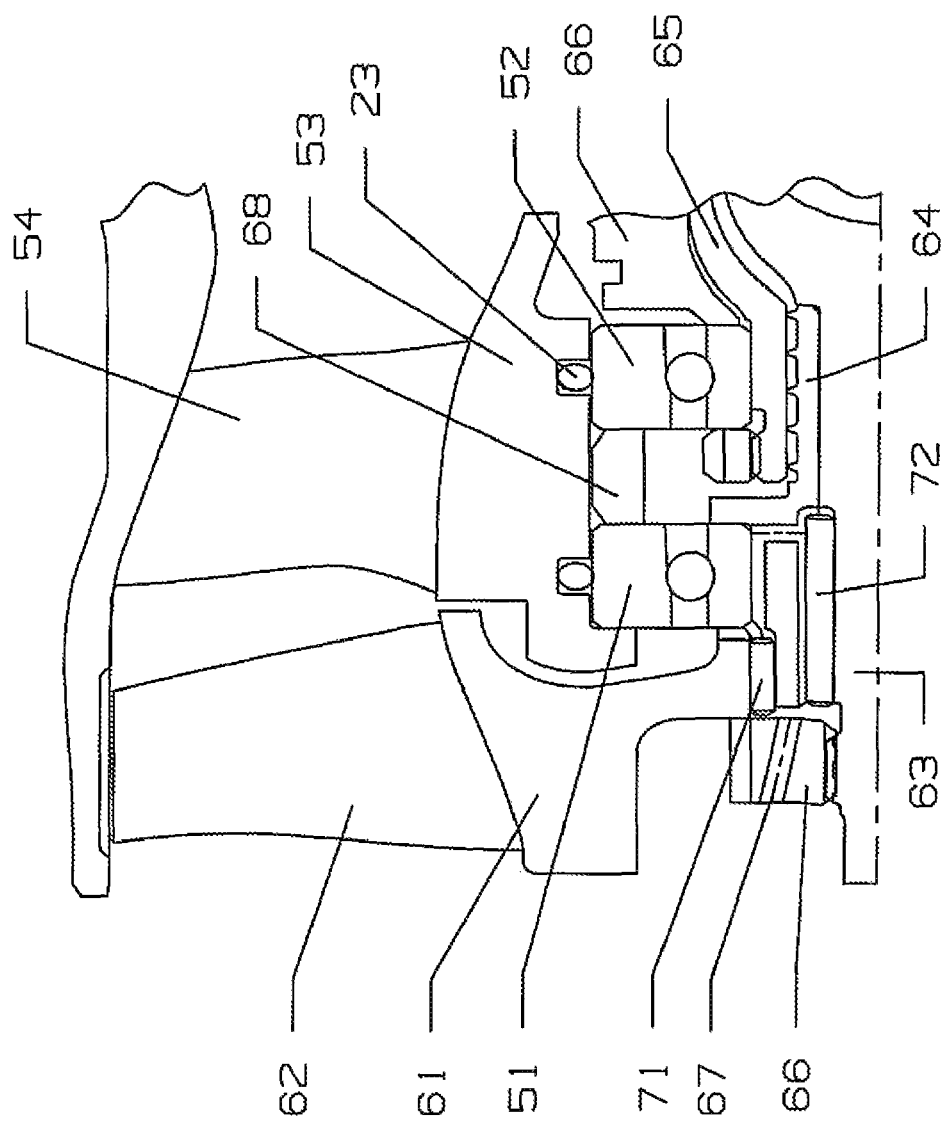
FIG. 4 shows the bearings for the compressor end of the gas turbine engine of the present invention.
Figure 5:
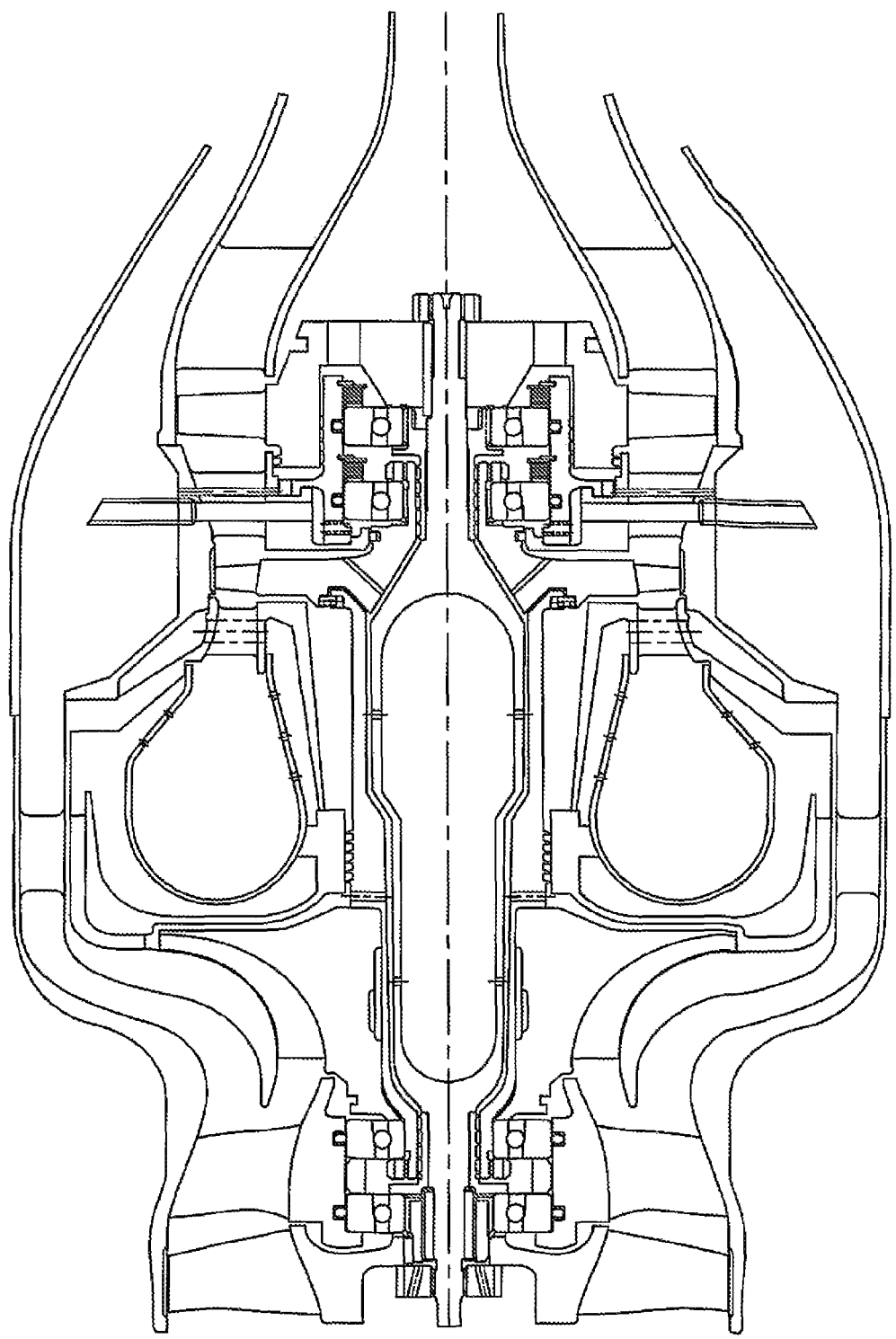
FIG. 5 shows the gas turbine engine with the bearings of the present invention.

FIG. 4 shows the forward end of the engine with the bearings that support the compressor and fan. A forward low speed bearing 51 and a forward high speed bearing 52 is supported on an inner surface of a bearing support surface on the inner shroud 53 of the guide vane assembly 54 for the compressor end of the engine. a fan rotor disk 61 with a plurality of fan blades 62 is secured to the low speed shaft 63 through an axial sleeve 64 that forms inner race cooling passages for the low speed bearing 51. The high speed bearing 52 is supported on an axial extension of the high speed shaft 54. A front end projection of the high pressure compressor 66 abuts the aft side of the high speed bearing 52 inner races. A threaded nut compresses the inner race of the high speed bearing 52 on the shaft 65. The axial sleeve 64 includes a radial projection that abuts the aft side of the low speed bearing 51 inner races. The inner race of the low speed bearing 51 is compressed between the radial projection of the axial sleeve 64 and the fan rotor disk 61 when a threaded nut 66 is tightened on the front end of the low speed shaft 63. The threaded nut 66 includes a plurality of holes 67 that extend from the aft side to the front side to allow for the cooling air passing through the bearings to discharge from bearing cooling passage.

Two axial pins 71 and 72 secure the fan rotor disk 61 to the low speed shaft 63. A first pin 71 is fitted within slots formed in the fan rotor disk 61 and the outer surface of the axial sleeve 64 to prevent relative rotation between these two members. The second pin 72 is fitted within slots formed on the inner surface of the axial sleeve 64 and the outer surface of the low speed shaft 63 to prevent relative rotation between these two members. Together, the two pins 71 and 72 secure the fan rotor disk 61 to the low speed shaft 63. the axial sleeve 64 also includes cooling air passages formed between the inner race of the low speed bearing 51 to allow for the cooling air to pass through the bearing and into the passage under the inner race toward the aft end, then downward toward the shaft 63, and then back toward the front end of the shaft 63 to be discharged out through the holes 67 in the threaded nut 66. The cooling air for the forward bearings is bleed off air from the fan that flows into a space formed between the inner shroud of the guide vane and the extension 66 of the high pressure compressor. The cooling air then flows through the high speed bearing 52 and into the bearing space, and then through the low speed bearing 51 before be directed through the inner race cooling passages of the low speed bearing 51.

The forward bearings 51 and 52 are also ball bearings with O-rings pressed against the outer race to provide damping to the bearings. An annular ring 68 forms a wedge member between the outer races of the two forward bearings to position the bearings. The forward bearings 51 and 52 are also allowed to slide in the axial direction against the inner surface of the bearing support 53 surface.

The bearings are supported by a single o-ring on the outer races of the bearings in order to provide damping for both shafts. In another embodiment, each bearing could be supported by two O-rings to better center the bias against the outer race, but would produce a higher frictional force acting against the bearing than would the single O-ring embodiment. The O-rings are formed of a high temperature elastomeric material such as Parker FF200 which is capable of withstanding a temperature of up to around 615 degrees F. The O-rings have a major diameter of 1.082 inches and a cross sectional diameter of 0.070 inches. The bearings have a thicker outer race than on the inner race in order to provide better hoop surface and to allow for the use on a single O-ring for damping. The O-ring can also be made from a material referred to as Calrez or Cham Raz.

The balls of the ball bearings and the inner surfaces of the races are coated with a lubricant and a hardener to provide for dry lubrication. The balls are formed of silicone nitride and coated with tungsten disulfide which is a solid lubricant. The inner races of the bearings are formed from Rex 20 (could be stainless steel) and are coated with layers formed from chromium nitride or titanium nitride (both hard coatings) alternating with tungsten disulfide (a solid lubricant). Thus, alternating coatings of chromium nitride and tungsten disulfide or titanium nitride and tungsten disulfide are formed on the inner and the outer races of the bearings. The bearings in the present invention have no cages in order to eliminate the need for lubrication. Bearings with cages require lubrication. The coatings described above provide for a bearing for use in the engine that does not require a lubricant. This is another main feature of the invention that allows for the small twin spool gas turbine engine to be operational, especially for a one time use like in a cruise missile that has a flying range of around one hour.

The two rotor shafts of the twin spool gas turbine engine of the present invention are both supported by two ball bearings in such a way that the turbine end of the shafts can be supported by ball bearings instead of the prior art roller bearings. The aft end ball bearings are allowed to slide axially so that the axial displacement between the rotor shaft and the guide vane assembly will not produce excessive axial loads on the aft end bearings. Also, the O-rings provide the necessary damping to the bearings to allow for the high rotational speeds that make the scaled down engine possible. The presence of the preload springs maintains a continuous load to the outer race so that the bearings do not become unloaded and therefore slip during operation.

I claim the following:

1. A small gas turbine engine comprising:
   A rotor shaft with a compressor secured on a forward end and a turbine secured on an aft end of the shaft;
   A forward end ball bearing to support the forward end of the rotor shaft;
   An aft end ball bearing to support the aft end of the rotor shaft;
   An inner race of the aft end ball bearing is supported such that no axial displacement between the inner race and the rotor shaft occurs;
   An outer race of the aft end ball beating is supported to allow for axial displacement between the outer race and the surface on which the outer race is supported; and,
   An O-ring positioned between the outer race of each ball bearing and an outer race support surface to provide damping for each bearing.

2. The small gas turbine engine of claim 1, and further comprising:
   A preload spring associated with the aft end ball bearing to apply a preload to the outer race of the aft end bearing.

3. The small gas turbine engine of claim 1, and further comprising:
   The O-ring is mounted within an annular groove formed within the outer race support surface.

4. The small gas turbine engine of claim 1, and further comprising:
   The O-ring is centered against the outer race of the beating.

5. The small gas turbine engine of claim 1, and further comprising:
   A cooling air passage formed between the inner race and the inner race support surface for each bearing to allow for cooling air to pass and provide cooling for the bearing.

6. The small gas turbine engine of claim 1, and further comprising:
   The outer race is thicker than the inner race to provide for a better hoop surface.

7. The small gas turbine engine of claim 1, and further comprising:
   The engine is a twin spool engine with a low speed shaft and a high speed shaft;
   Aft end bearings for the high speed and the low speed shafts are both ball beatings;
   The aft end ball bearings include outer races supported on a bearing support surface extending from a guide vane assembly;
   Each outer race of the aft ball beatings is biased by the O-ring; and,
   Each outer race of the aft ball bearings is mounted to the bearing support surface such that axial displacement can occur between the outer race and the outer race bearing support structure.

8. The small gas turbine engine of claim 7, and further comprising:
   Each of the aft ball bearings includes a preload spring to provide for a continuous load to the outer race of the aft end bearings so that the balls do not become unloaded.

9. The small gas turbine engine of claim 7, and further comprising:
   The outer race for each of the aft end ball bearings is thicker than the inner race to provide for a better hoop surface.

10. The small gas turbine engine of claim 7, and further comprising:
    The O-rings are supported in an annular groove formed within the outer race support surface.

11. The small gas turbine engine of claim 7, and further comprising:
    The inner race for each of the of end ball bearings forms a cooling air passage for the inner race.

12. The small gas turbine engine of claim 7, and further comprising:
    The two aft end ball bearings are positioned at about the same radial distance from the engine rotational axis.

13. The small gas turbine engine of claim 7, and further comprising:
    Two aft end ball bearings are mounted within a space that forms a cooling air passage through the two aft end ball bearings.

14. The small gas turbine engine of claim 7, and further comprising:
    Two forward end ball bearings and the two aft end ball bearings are the same size bearing.

15. The small gas turbine engine of claim 1, and further comprising:
    The forward end and aft end bearings are dry lubricated bearings.

16. The small gas turbine engine of claim 1, and further comprising:
    The balls of the ball bearings and the inner surfaces of the races are coated with a lubricant and a hardener to provide for dry lubrication.

17. The small gas turbine engine of claim 16, and further comprising:
    The balls are formed of silicone nitride and coated with tungsten disulfide which is a solid lubricant.

18. The small gas turbine engine of claim 16, and further comprising:
    The inner races of the bearings are coated with layers formed from chromium nitride or titanium nitride alternating with tungsten disulfide.

19. The small gas turbine engine of claim 16, and further comprising:
    The bearings are formed from Rex 20.

* * * * *